Nov. 20, 1951     G. C. CARLSON     2,575,330
PORTABLE JACK ACTUATED TIRE REMOVING DEVICE
Filed Feb. 2, 1946
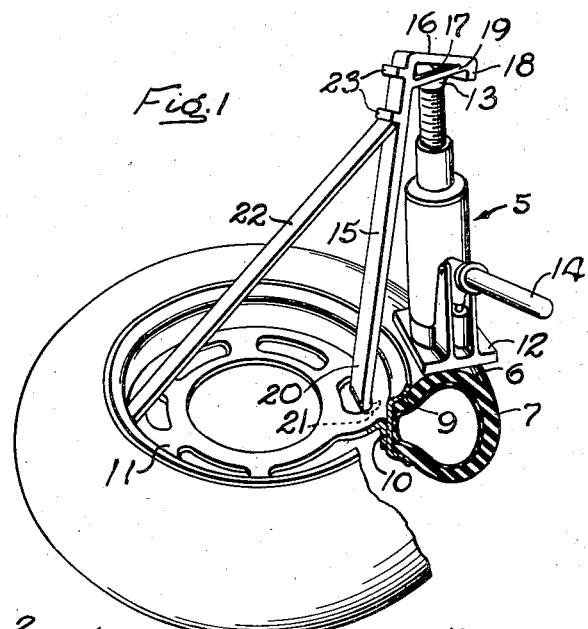
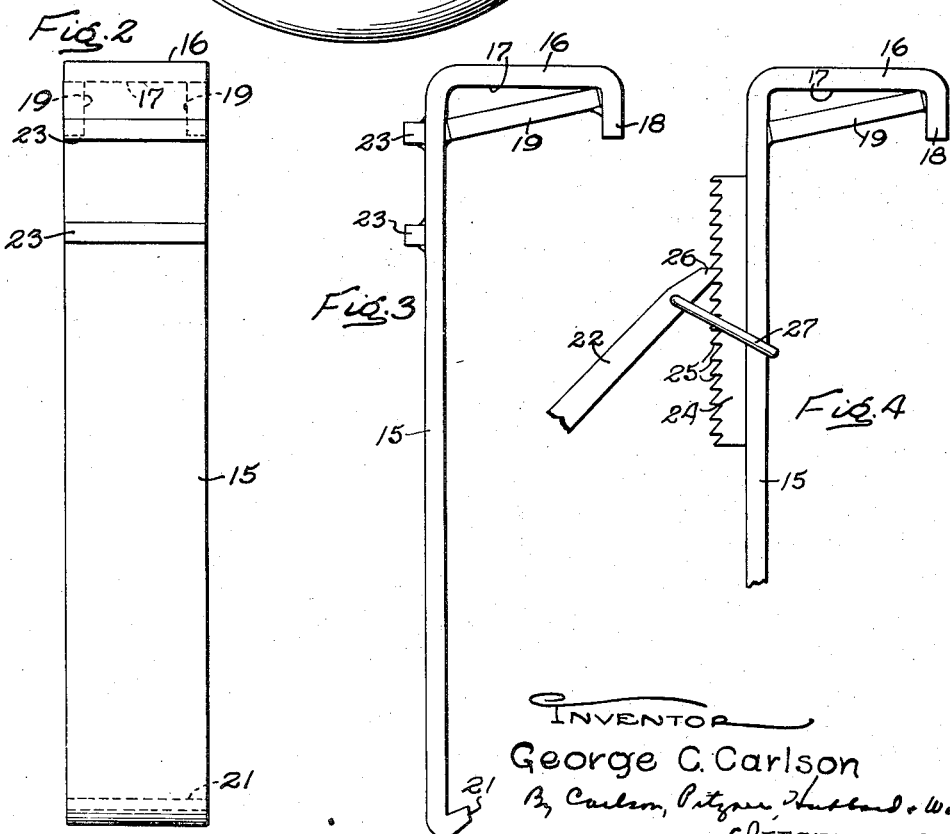
INVENTOR
George C. Carlson
By Carlson, Pitzner, Hubbard & Wolfe
ATTORNEYS Patented Nov. 20, 1951

2,575,330

UNITED STATES PATENT OFFICE 2,575,330

PORTABLE JACK ACTUATED TIRE
REMOVING DEVICE

George C. Carlson, Chetek, Wis.

Application February 2, 1946, Serial No. 645,179

1 Claim. (Cl. 157—1.17)

This invention relates to a device for facilitating the removal of a tire from the wheel of a heavy duty vehicle such as a truck.

One object is to provide a tire removing device of novel and inexpensive construction for enabling an ordinary extensible type lifting jack to be used in breaking a tire loose from the rim of a vehicle wheel.

Another object is to provide a device of the above character having an elongated member, one end of which may be hooked to the vehicle wheel adjacent the rim while the other end provides a seat for receiving one end of a jack abutting against the side of the tire to be loosened.

A further object is to provide a brace of novel construction for preventing tilting of the hook member while the jack is being extended to loosen the tire.

Other objects and advantages of the invention will become apparent from the following detailed description taken in connection with the accompanying drawings, in which Figure 1 is a perspective view of a device embodying the present invention illustrating its manner of use.

Fig. 2 is a face view of the hooked member of the device.

Fig. 3 is a side view.

Fig. 4 is a fragmentary perspective view of a modified form of the device.

While the invention is susceptible of various modifications and alternative constructions, I have shown in the drawings and will herein describe in detail the preferred embodiment. It is to be understood, however, that I do not intend to limit the invention by such disclosure but aim to cover all modifications and alternative constructions falling within the spirit and scope of the invention as expressed in the appended claim.

The device constituting the present invention is intended for use in utilizing a lifting jack 5 to apply to the side wall 6 of a tire 7 a laterally directed pressure of sufficient magnitude to break the tire edge loose from the flange 9 on the rim 10 of the vehicle wheel 11. The jack is of the heavy duty, preferably hydraulic, type commonly used in service stations and including a flat bottomed base 12 at one end and a head 13 at the other end separable from the base by actuation of an operating member 14.

In the form shown for purposes of illustration, the device includes a flat and substantially straight bar 15 somewhat longer than the height of the jack 5. One end portion 16 of the bar is bent laterally substantially at right angles to form an abutment 17 facing toward the other end of the bar and constituting a seat for receiving and engaging the jack head 13. To hold the head in the seat, the outer end of the bent portion 16 is bent to form a flange 18, and brace members 19 disposed on opposite sides of the jack head 13 connect the bar proper and the flange 18 to which their ends are secured as by welding. A rigid truss construction is thus formed capable of withstanding the substantial force required to be applied to the tire in some instances.

The other end portion of the bar 15 is sufficiently narrow to pass through the usual holes 20 found in ordinary truck wheels. This end 21 is bent laterally and reversely to form a hook on the same side of the bar as the seat 17 and opening toward the latter.

As the jack is extended to apply pressure to the side of the tire, the bar 15 is held against tilting by a brace comprising an elongated rod 22, one end of which is adapted to abut against the diametrically opposite side of the wheel at the junction between the wheel proper and the inner surface of the rim 10. The brace extends upwardly and across the wheel, and its other end is rigidly connected to the bar 15 with the latter disposed substantially perpendicular to the wheel. In the form shown in Fig. 1, this connection is formed by abutment of the brace end with a selected one of a plurality of lugs 23 spaced longitudinally of the bar adjacent the bent end 16 and rigidly secured to the bar as by welding. By providing a plurality of lugs, the brace is adapted for use with wheels of different sizes while permitting the hooked bar 15 to extend upwardly at the desired angle.

In the use of the device to loosen a tire from its rim, the bar 15 is hooked into the wheel as shown in Fig. 1, and the brace 22 is located so as to position the abutment 17 above the side of the tire to be loosened. Then, the jack 5 is rested on the tire with its upper end 13 projecting into the seat 17, after which the lever 14 is actuated to extend the jack. The bar 15 is thus placed under tension and, since it is held by the brace 22 against tilting, the force derived by operation of the jack is exerted downwardly on the tire side wall thereby breaking it loose from the wheel rim.

If desired, the brace 22 may be connected permanently to the hook member 15. One way of accomplishing this is illustrated in Fig. 4 wherein a block 24 having a series of teeth 25 is secured to the back of the hook member 15, and the brace end 26 which is engageable with any selected tooth is pivotally and also slidably connected to the bar 15. Such a connection may be formed by a ring 27 encircling the bar 15 and extending through the brace 22 at a point spaced from the ends of the latter. The connection is sufficiently loose to enable the brace end to be moved along the bar into engagement with any selected tooth.

I claim as my invention:

A tool for pressing a tire laterally off from the rim of a vehicle wheel comprising an elongated bar having a lateral abutment on one end adapted to pass through the vehicle wheel within and adjacent said rim and hook around a part of the wheel, means rigid with the other end of said bar and on the same side of the latter as said first abutment providing a second lateral abutment facing toward and overlying the side of the tire on said rim, a jack engageable at opposite ends with said abutment and said tire side and extensible longitudinally to force the tire laterally off from the rim, and a rigid brace member engageable at one end with said rim and having at the other end a connection with said bar at a point between said two abutments and adjacent the second abutment, said connection acting to hold the bar against tilting relative to said wheel during extension of said jack and being placed under compression upon extension of said jack after engagement of the latter with both said abutment and said tire.

GEORGE C. CARLSON.

REFERENCES CITED

The following references are of record in the file of this patent:

UNITED STATES PATENTS

| Number | Name | Date |
| --- | --- | --- |
| 1,475,517 | Snider | Nov. 27, 1923 |
| 1,475,519 | Snider | Nov. 27, 1923 |
| 1,890,746 | O'Dell | Dec. 13, 1932 |
| 1,983,608 | Hand | Dec. 11, 1934 |
| 2,464,621 | Vanleirsberghe | Mar. 15, 1949 |